United States Patent [19] [11] Patent Number: 4,661,278
Nagaraj et al. [45] Date of Patent: Apr. 28, 1987

[54] MONOTHIOPHOSPHINATES AS ACID, NEUTRAL, OR MILDLY ALKALINE CIRCUIT SULFIDE COLLECTORS AND PROCESS FOR USING SAME

[75] Inventors: D. R. Nagaraj, Stamford; Samuel S. Wang, Cheshire, both of Conn.

[73] Assignee: American Cyanamid Company, Stamford, Conn.

[21] Appl. No.: 817,209

[22] Filed: Jan. 8, 1986

Related U.S. Application Data

[62] Division of Ser. No. 675,489, Nov. 28, 1984, Pat. No. 4,587,013.

[51] Int. Cl.[4] .......... C07F 9/30; C09K 3/00

[52] U.S. Cl. .......... 252/61; 260/502.4 R; 558/73; 558/186

[58] Field of Search .......... 252/61; 260/502.4 E; 558/73, 186

[56] References Cited

U.S. PATENT DOCUMENTS

| | | | |
|---|---|---|---|
| 1,593,232 | 7/1926 | Whitworth | 252/61 |
| 2,919,025 | 12/1959 | Booth et al. | 252/61 |
| 3,317,040 | 5/1967 | Booth | 252/61 |
| 3,401,185 | 9/1968 | Meinhardt | 524/137 |

FOREIGN PATENT DOCUMENTS

| | | | |
|---|---|---|---|
| 902802 | 8/1962 | United Kingdom | 260/502.4 E |

OTHER PUBLICATIONS

Solozhenkin et al., "Flotation Properties of Sulfur-Containing Phosphorus Derivatives;" Dokl. Akad. Nauk Tadzh. SSR, 13(4), 26-30 (1970).

Mastryukova et al., "Reaction of Monothio Acids of Phosphorus with Diazoacetic Ester," Zh. Obshch. Khim. 1981, 51(7), 1475-1477, (CA 95:204068z).

*Primary Examiner*—Robert A. Wax
*Attorney, Agent, or Firm*—Frank M. VanRiet

[57] ABSTRACT

A process for the beneficiation of base metal sulfide mineral values from base metal sulfide ores with selective rejection of gangue sulfide minerals at pH values below about 10.0 by froth flotation is disclosed. The process includes the use of a new and improved collector which at pH values below about 10.0 exhibits unexpectedly high collector activity for base metal sulfide minerals of copper, nickel, molybdenum, cobalt and zinc and selectively rejects gangue sulfide minerals such as pyrite and pyrrhotite. The collector for base metal sulfide mineral values for use in the process comprises at least one diorganomonothiophosphinate compound having the formula:

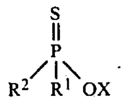

wherein $R^1$ and $R^2$ are each, independently, selected from saturated and unsaturated hydrocarbyl radicals, alkyl polyether radicals, and aromatic radicals, and such radicals, optionally and independently, substituted with polar groups selected from halogen, nitrile and nitro groups; or wherein $R^1$ and $R^2$ together form a heterocyclic ring having the formula:

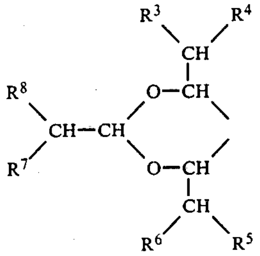

wherein $R^3$, $R^4$, $R^5$, $R^6$, $R^7$ and $R^8$ are each, independently, selected from hydrogen and $C_1$ to $C_{12}$ alkyl groups; and X is selected from hydrogen, an alkali or alkaline earth metal and $NH_4$ groups. The collectors and process provide excellent metallurgical recoveries of copper sulfide mineral values of high grade at a substantial reduction in lime consumption and reagents costs associated with prior art flotation separation methods. An improved process for Cu-Mo separation is also disclosed.

5 Claims, No Drawings

MONOTHIOPHOSPHINATES AS ACID, NEUTRAL, OR MILDLY ALKALINE CIRCUIT SULFIDE COLLECTORS AND PROCESS FOR USING SAME

This application is a division of application Ser. No. 675,489, filed Nov. 28, 1984 and now U.S. Pat. No. 4,587,013, issued May 6, 1986.

BACKGROUND OF THE INVENTION

The present invention relates to froth flotation processes for recovery of mineral values from base metal sulfide ores. More particularly, it relates to new and improved sulfide collectors comprising certain diorganomonothiophosphinate compounds which exhibit excellent metallurgical performance over a broad range of pH values.

Froth flotation is one of the most widely used processes for beneficiating ores containing valuable minerals. It is especially used for separating finely ground valuable minerals from their associated gangue or for separating valuable minerals from one another. The process is based on the affinity of suitably prepared mineral surfaces for air bubbles. In froth flotation, a froth or a foam is formed by introducing air into an agitated pulp of the finely ground ore and water containing a frothing or a foaming agent. A chief advantage of separation by froth flotation is that it is a relatively efficient operation at a substantially lower cost than many other processes.

Current theory and practice state that the success of the sulfide flotation process depends to a great degree on reagents called collectors that impart selective hydrophobicity to the mineral value which has to be separated from other minerals. Thus, the flotation separation of one mineral species from another depends upon the relative wettability of these mineral surfaces by water. Typically, the surface free energy is purportedly lowered by the adsorption of heteropolar collectors. The hydrophobic coating thus provided, acts in this explanation, as a bridge so that the mineral particles may be attached to an air bubble. The practice of this invention is not, however, limited by this or other theories of flotation.

In addition to the collector, several other reagents are necessary. Among these are the frothing agents used to provide a stable flotation froth, persistent enough to facilitate mineral separation, but not so persistent that it cannot be broken down to allow subsequent processing. The most commonly used frothing agents are pine oil, creosote and cresylic acid and alcohols such as 4-methyl-2-pentanol, polypropylene glycols and ethers, etc.

Moreover, certain other important reagents, such as the modifiers, are also largely responsible for the success of flotation separation of the sulfide and other minerals. Modifiers include all reagents whose principal function is neither collecting nor frothing, but one of modifying the surface of the mineral so that a collector either adsorbs to it or does not. Modifying agents may thus be considered as depressants activators, pH regulators, dispersants, deactivators, etc. Often, a modifier may perform several functions simultaneously. Current theory and practice of sulfide flotation again state that the effectiveness of all classes of flotation agents, depends to a large extent on the degree of alkalinity or acidity of the ore pulp. As a result, modifiers that regulate the pH are of great importance. The most commonly used pH regulators are lime, soda ash and, to a lesser extent, caustic soda. In sulfide flotation, however, lime is by far the most extensively used. In copper sulfide flotation, which dominates the sulfide flotation industry, or example, lime is used to maintain pH values over 10.5, more usually above 11.0 and often as high as 12 or 12.5. In prior art sulfide flotation processes, preadjustment of the pH of the pulp slurry to 11.0 and above is necessary, not only to depress the notorious gangue sulfide minerals of iron, such as pyrite and pyrrhotite, but also to improve the performance of a majority of the conventional sulfide collectors, such as xanthates, dithiophosphates, trithiocarbonates and thionocarbamates. The costs associated with adding lime are becoming quite high and plant operations are interested in flotation processes which require little or no lime addition, i.e., flotation processes which are effectively conducted at slightly alkaline, neutral or even at acid pH values. Neutral and acid circuit flotation processes are particularly desired because pulp slurries may be easily acidified by the addition of sulfuric acid, and sulfuric acid is obtained in many plants as a byproduct of the smelters. Therefore, flotation processes which do not require preadjustment of pH or which provide for pH preadjustment to neutral or acid pH values using less expensive sulfuric acid are preferable to current flotation processes, which presently require pH preadjustment to highly alkaline values of at least about 11.0 using lime which is more costly.

To better illustrate the current problems, in 1980, the amount of lime used by the U.S. copper and molybdenum industry was close to about 550 million pounds. For this industry, like accounted for almost 92.5% by weight of the total quantity of reagents used, and the dollar value of the lime used was about 51.4% of the total reagent cost of the industry, which amounted to over 28 million dollars.

As has been mentioned above, lime consumption in individual plants may vary anywhere from about one pound of lime per metric ton of ore processed, up to as high as 20 pounds of lime per metric ton of ore. In certain geographical locations, such as South America, lime is a scarce commodity, and the currents costs of transporting and/or importing lime have risen considerably in recent years. Still another problem with prior art highly alkaline processes is, that the addition of large quantities of lime to achieve sufficiently high pH causes scale formation on plant and flotation equipment, thereby necessitating frequent and costly plant shutdowns for cleaning.

It is apparent, therefore, that there is a strong desire to reduce or eliminate the need for adding lime to sulfide flotation processes to provide substantial savings in reagents costs. In addition, reducing or eliminating lime in sulfide ore processes will provide other advantages by facilitating the operation and practice of unit operations other than flotation, such as fluids handling or solids handling, as well as, the improved recovery of secondary minerals.

In the past, xanthates and dithiophosphates have been employed as sulfide collectors in the froth flotation of base metal sulfide ores. A major problem with these sulfide collectors is that at pH's below 11.0, poor rejection of pyrite or pyrrhotite is obtained. More particularly, in accordance with present sulfide flotation theory, the increased flotation of pyrite at a pH of less than 11 is attributed to the ease of oxidation of thio collectors to form corresponding dithiolates, which are believed to be responsible for pyrite flotation. Simultaneously, however, with decreasing pH, the collecting power of these sulfide collectors for copper sulfide minerals decreases, rendering them unsuitable for flotation in mildly alkaline, neutral or acid environments. This decrease in collecting power with decreasing pH, e.g., below about 11.0, requires that the collector dosage be increased many fold, rendering it generally economically unattractive. Moreover, an increase in collector dosage to promote copper sulfide flotation at these pH's further increases pyrite flotation, thereby giving rise to unacceptable copper concentrates. The decrease in copper flotation may result for many reasons. A thiol collector may interact differently with different sulfide minerals at a given pH. On the other hand, poor solution stability, i.e., the ease of oxidation, of xanthates and trithiocarbonates at lower pH values may very well explain the observed decrease in copper sulfide flotation and increase in pyrite flotation, i.e., the observed weak collector behavior.

Alkyl and aralkyl dithiophosphoric acid salts have been widely used as sulfide collectors for over 50 years. On the other hand, the organophosphorous compounds wherein there is a direct bond between C and P have not been used as widely. In U.S. Pat. No. 3,355,017, for example, it is disclosed that diisobutyldithiophosphinate may be used as the collector to provide superior collector activity, in comparison with the corresponding dithiophosphates. These collectors have, indeed, shown superior collecting properties in a variety of ores. One problem, however, is that they do not perform satisfactorily in acid, neutral or mildly alkaline circuits. Similarly, the dithiophosphates do not perform satisfactorily at a pH of less than about 10, especially for copper sulfide flotation.

In U.S. Pat. No. 2,919,025, a reagent containing a mixture of mono and dithiophosphates is disclosed to overcome the shortcomings of the dithiophosphate collectors. This reagent has been successfully used as an acid circuit collector, e.g., at pH values of from 3.5 to 6.0, for copper sulfide ores. The major drawback of this reagent is the difficulty of preparation to yield a consistent product from batch to batch. Secondly, the reagent still contains a substantial quantity of the dithio compound which exhibits poor collector strength in acid, neutral or mildly alkaline circuits. The efficacy of this reagent is therefore lowered, even though it is still better than a reagent comprising only the corresponding straight dithiophosphate. This reagent, however, did provide evidence to indicate that diethylmonothiophosphate was superior in collector behavior in an acid environment as compared with diethyl dithiophosphate.

In a related system of sulfur-containing organophosphorus compounds, the collector properties of diisobutyldithiophosphinate are known, although not as well as, those of the dithiophosphates. The collector properties of a corresponding diisobutylmonothiophosphinate are not known in the literature. The Soviet authors, P. M. Solozhenkin, et al, in an article entitled, "Flotation Properties of Sulfur-Containing Phosphorus Derivatives," appearing on Dokl. Akad. Nauk Tadzh. SSR 13, No. 4, 26-30 (1970), disclose collector properties for diethylmonothiophosphinate in flotations of galena, pyrite and antimonite. These authors also disclose a method for the synthesis of a diethylmonothiophosphinate compound. A mention is made of diphenylmonothiophosphinic acid, but its collector property has not been studied. These authors compared the flotation collector properties of diethylmonothiophosphate/-phosphinate and diethyl dithiophosphate/phosphinate in flotation of galena, pyrite and antimonite. The results of their study indicate that the dithiophosphinate is better than the monothiophosphinate at all concentrations for galena, pyrite and antimonite, and at all pH values for galena. The authors state that the increase in the flotability of minerals observed upon transition from phosphorous monothio acids to dithio acids is related to the effect of electron donor substituents on an increase in the effective negative charge on the sulfur atoms responsible for the reaction with the metal cation. Their results clearly indicated that the dithiophosphinate was a much better collector than the monothiophosphinate at all pH values. The article fails to disclose or suggest the use of either diethylmonothiophosphinate or diethyl dithiophosphinate for flotation of other minerals. The article provides no trends or definite theory of the collector properties of these materials such that any prediction of their flotation properties on other minerals such as copper, for example, cannot be determined. Moreover, said article fails to disclose or suggest that selective flotation of copper sulfide minerals with simultaneous rejection of pyrite, pyrrhotite and other gangue sulfides is obtained with a diorganomonothiophosphinate at a pH of less than 10. Applicants, in contradistinction to the work of the Soviet authors, have discovered that for base metal sulfide flotation, particularly copper sulfide flotations, the monothiophosphinate compounds are far superior to the dithiophosphinates over a broad range of pH including pH's of less than about 10.0.

Accordingly, it is an object of the present invention to provide a new and improved sulfide collector and flotation process for the beneficiation of base metal sulfide minerals employing froth flotation methods which does not require preadjustment of pH to highly alkaline values.

It is another object of the present invention to provide a new and improved sulfide collector and froth flotation process for the beneficiation of base metal sulfide minerals which provides selective recovery of sulfide material values with selective rejection of pyrite, pyrrhotite and other gangue sulfides.

It is a further object of the present invention to provide a flotation process for the beneficiation of base metal sulfide ores at pH values of 10.0 or below using certain novel collectors containing novel donor atom combinations designed specifically for low pH flotation.

It is still another object of the present invention to provide a new and improved process for selective flotation of value sulfide minerals in acid circuits, wherein inexpensive sulfuric acid is used to control the pH.

SUMMARY OF THE INVENTION

In accordance with these and other objects, the present invention, in one embodiment, provides a new and improved collector composition for beneficiating base metal sulfide mineral values from a base metal sulfide ore with selective rejection of pyrite, pyrrhotite and other gangue sulfides, said collector composition comprising at least one diorganomonothiophosphinate compound, selected from compounds of the formula:

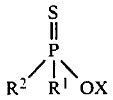

wherein $R^1$ and $R^2$ are each, independently, selected from saturated and unsaturated hydrocarbyl radicals, alkyl polyether radicals, and aromatic radicals; and such radicals optionally and independently substituted with polar groups selected from halogen, nitrile and nitro groups; or wherein $R^1$ and $R^2$ together form a heterocyclic ring having the formula:

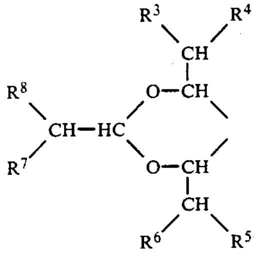

wherein $R^3$, $R^4$, $R^5$, $R^6$, $R^7$ and $R^8$ are each, independently, selected from hydrogen and $C_1$ to $C_{12}$ alkyl; and X is selected from hydrogen, alkali or alkaline earth metal and $NH_4$ groups.

Particularly preferred diorganomonothiophosphinate sulfide collectors in accordance with the present invention comprise compounds of the formula wherein $R^1$ and $R^2$ are the same branched alkyl, e.g., isopropyl, isobutyl, 2-methylpentyl, 2-ethylhexyl and the like. Especially preferred monothiophosphinate collectors in accordance with the present invention and within the above formula are diisobutylmonothiophosphinic acid salts and salts of 1,3,5-triisopropyl-4,6-dioxa-2-phosphacyclohexane monothiophosphinic acid.

Generally, and without limitation, the new and improved diorganomonothiophosphinate collectors of this invention may be used in amounts of from about 1 to 500 grams/metric ton of ore (0.002 to 1.0 lb/ton or ore) and preferably from about 5 to 150 grams/metric ton of ore (0.01 to 0.3 lbs/ton of ore), to effectively selectively recover metal and mineral values from base metal sulfide ores while selectively rejecting pyrite and other gangue sulfides. The new and improved sulfide collectors of this invention may generally be employed independently of the pH of the pulp slurries. Again, without limitation, these collectors may be employed at pH values of from about 3.5 to 11.0, and preferably from about 4.0 to 10.0.

In accordance with another embodiment, the present invention provides a new and improved process for beneficiating an ore containing sulfide minerals with selective rejection of pyrite and pyrrhotite, said process comprising: grinding said ore to provide particles of flotation size, slurrying said particles in an aqueous medium, conditioning said slurry with effective amounts of a frothing agent and a metal collector, and frothing the desired sulfide minerals preferentially over gangue sulfide minerals by froth flotation procedures; said metal collector comprising at least one diorganomonothiophosphinate compound selected from compounds having the formula given above.

In particularly preferred embodiments, a new and improved method for enhancing the recovery of copper sulfide minerals from an ore containing a variety of sulfide minerals is provided wherein the flotation process is performed at a controlled pH of less than or equal to 10.0, and the collector is added to the flotation cell.

The present invention therefore provides a new class of sulfide collectors and a new and improved process for froth flotation of base metal sulfide ores. The diorganomonothiophosphinate collectors and the process of the present invention unexpectedly provide superior metallurgical recovery in froth flotation separations as compared with conventional sulfide collectors, even at reduced collector dosages, and are effective under conditions of acid, neutral or mildly alkaline pH. In accordance with the present invention, a sulfide ore froth flotation process is provided which simultaneously provides for superior beneficiation of sulfide mineral values with considerable savings in lime consumption.

Other objects and advantages of the present invention will become apparent from the following detailed description and illustrative working examples.

DETAILED DESCRIPTION OF THE INVENTION

In accordance with the present invention, sulfide metal and mineral values are recovered by froth flotation methods in the presence of a novel sulfide collector, said collector comprising at least one diorganomonothiophosphinate compound of the formula:

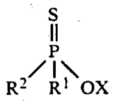

wherein $R^1$ and $R^2$ are each, independently, selected from saturated and unsaturated hydrocarbyl radicals, alkyl polyether radicals, and aromatic radicals; and such radicals optionally and independently substituted with polar groups selected from halogen, nitrile and nitro groups; or wherein $R^1$ and $R^2$ together form a heterocyclic ring having the formula:

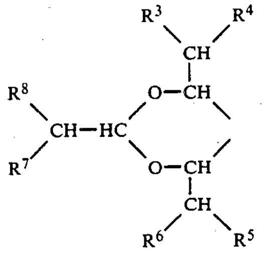

wherein $R^3$, $R^4$, $R^5$, $R^6$, $R^7$ and $R^8$ are each, independently, selected from hydrogen and $C_1$ to $C_{12}$ alkyl, and X is selected from hydrogen, alkali or alkaline earth metals and $NH_4$. By hydrocarbyl is meant a radical comprised of hydrogen and carbon atoms which includes straight or branched, saturated or unsaturated, cyclic or acyclic hydrocarbon radicals. The $R^1$ and $R^2$ radicals may be unsubstituted or optionally substituted by polar groups such as halogen, nitrile or nitro groups. In addition, $R^1$ and $R^2$ may independently be selected from alkyl polyether radicals of the formula:

$$R^9(OY)_n-$$

wherein $R^9$ is $C_1$ to $C_6$ alkyl; Y is an ethylene or propylene group and n is an integer of from 1 to 4 inclusive. $R^1$ and $R^2$ may also independently be selected from aromatic radicals such as benzyl, phenyl, cresyl and xylenyl radicals, and aralkyl or alkaryl radicals, or any of these aromatic radicals optionally substituted by the above-mentioned polar groups.

In preferred embodiments, the diorganomonothiophosphinate collectors of the above formula are those compounds wherein $R^1$ and $R^2$ are $C_1$–$C_8$ alkyl radicals, for example, methyl, ethyl, n-propyl, isopropyl, n-butyl, sec-butyl, isobutyl, n-amyl, isoamyl, n-hexyl, isohexyl, heptyl, n-octyl and 2-ethylhexyl, especially wherein $R^1$ and $R^2$ are the same, preferably branched, alkyl radicals. For the monothiophosphinate collectors of the formula wherein $R^1$ and $R^2$ together form a heterocyclic ring, $R^3$, $R^4$, $R^5$, $R^6$, $R^7$ and $R^8$ are preferably selected so as to form branched alkyl substituents from the heterocyclic ring, e.g., as is obtained wherein $R^3$, $R^5$ and $R^7$ on the one hand and $R^4$, $R^6$ and $R^8$ on the other, comprise the same or different $C_1$ to $C_{12}$ alkyl groups.

Illustrative compounds within the above formulas for use as sulfide collectors in accordance with the present invention include:

sodium diisopropylmonothiophosphinate;
ammonium diisobutylmonothiophosphinate;
potassium isopropylisobutylmonothiophosphinate;
lithium poly(propylene oxide)isobutylmonothiophosphinate;
sodium ditolylmonothiophosphinate;
ammonium phenylisobutylmonothiophosphinate;
sodium 1,3,5-triisopropyl-4,6-dioxa-2-phospha-cyclohexane monothiophosphinate;
ammonium 1,3,5-triisobutyl-4,6-dioxa-2-phospha-cyclohexane monothiophosphinate; lithium 1,3,5-triisoamyl-4,6-dioza-2-phospha-cyclohexane monothiophosphinate; and
potassium 1,3,5-tris(2-ethylhexyl)-4,6-dioxa-2-phospha-cyclohexane monothiophosphinate, to name but a few.

The diorganomonothiophosphinate compounds of the present invention may be prepared by several different methods. In one method, a corresponding diorganothiophosphoryl chloride is hydrolyzed to provide the diorganomonothiophosphinate, in accordance with the following equation:

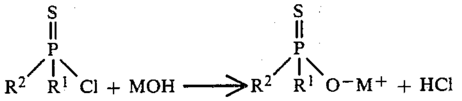

Another method of making the diorganomonothiophosphinate compounds of the present invention is by a Grignard synthesis, such as that described by Solozhenkin et al in the above cited article, and summarized by the equation:

$$PCl_3 + 3R^1OH \longrightarrow (R^1O)_2P(O)H;$$

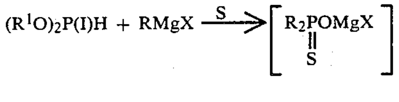

-continued

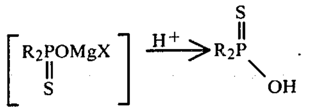

Although the above-described methods may be useful for preparing the diorganomonothiophosphinate compounds of the present invention, they are not very practical.

An especially preferred method for making the new and improved diorganomonothiophosphinate compounds of the present invention is in accordance with the method taught in U.S. Pat. No. 4,555,368, issued Nov. 26, 1986 to Robertson, which is specifically incorporated herein by reference. More particularly, in accordance with this preferred method, the corresponding diorganophosphine is oxidized, in the presence of air or hydrogen peroxide, to form the corresponding diorganophosphine oxide, which is thereafter reacted with sulfur in the presence of an alkali or alkaline earth metal hydroxide or ammonium hydroxide in accordance with the equation:

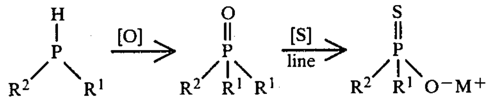

wherein $R^1$ and $R^2$ are defined as above, and $M^+$—Na, K or $NH_4$, for example. Further details of the reaction conditions used and concentration of reagents employed may be found in said application.

In accordance with the present invention, the above-described diorganomonothiophosphinate compounds are employed as sulfide collectors in a new and improved froth flotation process which provides a method for enhanced beneficiation of sulfide mineral values from base metal sulfide ores over a wide range of pH values and more particularly under acidic, neutral, slightly alkaline conditions.

In accordance with the present invention, the new and improved process for the beneficiation of mineral values from base metal sulfide ores comprises, firstly, the step of size-reducing the ore to provide ore particles of flotation size. As is apparent to those skilled in this art, the particle size to which an ore must be size-reduced in order to liberate mineral values from associated gangue or non-values, i.e., liberation size, will vary from ore to ore and may depend on several factors, such as, for example, the geometry of the mineral deposits within the ore, e.g., striations, agglomeration, comatrices, etc. In any event, as is common in this art, a determination that particles have been size-reduced to liberation size may be made by microscopic examination. Generally, and without limitation, suitable particle size will vary from between about 50 mesh to about 400 mesh sizes. Preferably, the ore will be size-reduced to provide flotation sized particles of between about +65 mesh and about −200 mesh. Especially preferably for use in the present method are base metal sulfide ores which have been size-reduced to provide from about 14% to about 30% by weight of particles of +100 mesh and from about 45% to about 75% by weight of particles of −200 mesh sizes.

Size-reduction of the ores may be performed in accordance with any method known to those skilled in this art. For example, the ore can be crushed to −10 mesh size followed by wet grinding in a steel ball mill to specified mesh size, or autogenous or semi-autogenous grinding or pebble milling may be used. The procedure employed in size-reducing the ore is not critical to the method of this invention, as long as particles of effective flotation size are provided.

Preadjustment of pH is conveniently performed by addition of the modifier to the grind during the size reduction step.

The pH of the pulp slurry may be pre-adjusted to any desired value by the addition of either acid or base, and typically sulfuric acid or lime are used for this purpose, respectively. A distinct advantage of the present process is that the new and improved diorganomonothiophosphinate sulfide collectors employed in the process of this invention do not require any pre-adjustment of pH and generally the flotation may be performed at the natural pH of the ore pulp, thereby simplifying the process, saving costs and reducing lime consumption and related plant shut-downs. Thus, for example, good beneficiation has been obtained in accordance with the process of the present invention at pH values ranging between 3.5 and 11.0, and especially good beneficiation has been observed with pH values within the range of from about 4.0 to about 10.0 pH.

The size-reduced ore, e.g., comprising particles of liberation size, is thereafter slurried in aqueous medium to provide a flotable pulp. The aqueous slurry or pulp of flotation sized ore particles, typically in a flotation apparatus, is adjusted to provide a pulp slurry which contains from about 10 to 60% by weight of pulp solids, preferably 25 to 50% by weight and especially preferably from about 30% to about 40% by weight of pulp solids.

In accordance with a preferred embodiment of the process of the present invention, the flotation of copper, nickel, zinc and lead sulfides is performed at a pH of less than or equal to 10.0 and preferably less than 10.0. It has been discovered that in conducting the flotation at this pH, the new and improved diorganomonothiophosphinate collectors of the present invention exhibit exceptionally good collector strength, together with excellent collector selectivity, even at reduced collector dosages. Accordingly, in this preferred process, sulfuric acid is used to bring the pH of the pulp slurry to less than or equal to 10.0, if necesssary.

In any event and for whatever reason, the pH of the pulp slurry may be pre-adjusted if desired at this time by any method known to those skilled in the art.

After the pulp slurry has been prepared, the slurry is conditioned by adding effective amounts of a frothing agent and a collector comprising at least one diorganomonothiophosphinate compound as described above. By "effective amount" is meant any amount of the respective components which provides a desired level of beneficiation of the desired mineral values.

More particularly, any known frothing agent may be employed in the process of the present invention. By way of illustration such floating agents as straight or branched chain low molecular weight hydrocarbon alcohols, such as $C_6$ to $C_8$ alkanols, 2-ethyl hexanol and 4-methyl-2-pentanol, also known as methyl isobutyl carbinol (MIBC) may be employed, as well as, pine oils, cresylic acid, polyglycol or monoethers of polyglycols and alcohol ethoxylates, to name but a few of the frothing agents which may be used as frothing agent(s) herein. Generally, and without limitation, the frothing agent(s) will be added in conventional amounts and amounts of from about 0.01 to about 0.2 pounds of frothing agent per ton of ore treated are suitable.

It has also been discovered that the new and improved diorganomonothiophosphinate collectors of the present invention exhibit some self-frothing character. This is another unexpected advantage of the collectors of this invention, because in addition to the savings provided by reduced lime consumption and lower effective collector dosages with the collectors of this invention frother dosages may be reduced as well, thereby providing further savings in reagents costs.

The new and improved diorganomonothiophosphinate sulfide collectors for use in the process of the present invention may generally be added in amounts of from 1 to 500 g/metric ton (0.002 to 1.0 lbs/ton) by weight of ore and preferably will be added in amounts of from about 5 to 150 grams/metric ton (0.01 to 0.3 lbs/ton) of ore processed. Although the collectors exhibit excellent collector activity and selectivity for certain sulfide mineral values at pH of less than 10.0, namely those of copper, nickel, lead and zinc, over gangue sulfide minerals such as pyrite and pyrrhotite, bulk sulfide flotations are possible with the collectors of this invention under specified conditions to be more particularly defined below.

Thereafter, in accordance with the process of the present invention, the conditioned slurry, containing an effective amount of frothing agent and an effective amount of collector comprising at least one diorganomonothiophosphinate compound, is subjected to a frothing step in accordance with conventional froth flotation methods to collect the desired sulfide mineral values in the froth concentrate and selectively reject or depress pyrite and other gangue sulfides.

Hereinabove, the new and improved diorganomonothiophosphinate collectors and processes incorporating them of the present invention have been described for use in those applications wherein it is desired to selectively concentrate or collect certain value mineral sulfides, mainly those of copper, nickel, lead and zinc from other gangue sulfides, e.g., pyrite and pyrrhotite, and other gangue materials, e.g., silicates, carbonates, etc. In certain cases, however, it may be desirable to collect all of the sulfides in an ore, including sphalerite (ZnS) and the iron sulfides, i.e., pyrite and pyrrhotite, in addition to the copper sulfide minerals.

More particularly, there exist certain massive or complex sulfide ores which contain large amounts of iron sulfide minerals, such as pyrite and pyrrhotite. With these complex sulfide ores, flotation of the iron sulfide minerals is frequently desired to obtain the sulfur-values from these minerals, which after further processing can be made to yield sulfur and sulfur reagents. Under these circumstances, a bulk sulfide flotation is desired, i.e., a flotation wherein all of the sulfide minerals are floated and collected. Bulk sulfide flotations are also desired in order to beneficiate precious metals from precious metal-bearing pyrite and pyrrohotite minerals.

Often, however, these massive or complex sulfide ores not only contain several value metals as sulfides, such as copper, zinc, lead, nickel, cobalt, etc., but also contain, in close association therewith, gangue materials such as carbonates, as well as, silicas and siliceous materials.

These massive or complex sulfide ores are not uncommon and present a unique set of problems for froth flotation beneficiation. Bulk sulfide flotation for these ores cannot be successfully conducted under conventional flotation conditions, e.g., at pH values of 10.0, because pyrite and pyrrhotite values are depressed at high pH values. At pH values of 3.0 to 5.0, bulk sulfide flotation is high using conventional collectors, such as xanthates, but sulfuric acid is used as the modifier to reduce the pulp pH to these values. The carbonate gangue minerals present in these complex ores are acid-soluble and consequently large amounts of sulfuric acid are required, e.g. about 10–12 lbs/ton of ore, which is economically unattractive, and the use of sulfuric acid with ores containing alkaline earth metal carbonates such as calcite, dolomite, etc. results in the formation of large amounts of insoluble, alkaline earth metal sulfates, which causes very severe scaling on plant equipment, again necessitating frequent and costly plant shutdowns. At a pulp pH in the range of about 6.0 to 9.0, bulk sulfide flotation with conventional collectors such as xanthates is less than optimum.

It has been unexpectedly discovered that the new and improved diorganomonothiophosphinate collectors of this invention, under carefully specified conditions, provide optimum flotation of bulk sulfides from sulfide containing ores. In accordance with this aspect of the present invention, optimum bulk sulfide flotations are obtained by performing froth flotation under neutral or slightly alkaline pH values, and more particularly at a pH of 6.0 to 9.0, inclusive, and employing a larger amount of the diorganomonothiophosphinate collectors of this invention, namely at dosage levels of from about 0.1 to about 0.5 lbs/ton or, expressed differently, at levels of equal to or above about 0.3 moles/metric ton of ore.

After the bulk sulfide concentrate is prepared by flotation under these pH conditions and at the collector dosages specified, the value sulfides of copper, lead and zinc are separated from the large amount of iron sulfides present in the bulk concentrate, by a second stage flotation at a higher pH, i.e. values about 9.0, whereby the value sulfides are collected and the iron sulfides are selectively depressed. In the past, xanthate collectors were employed in the bulk flotation at pH values of 3.0 to 5.0, and the second stage flotation wherein the iron sulfides are selectively depressed had to be run at a pH of about 11.0, because pyrite rejection for the xanthate collectors is poor below pH 11.0. As can be appreciated, considerable quantities of lime had to be added to modify the pH for this second stage flotation. Now, in accordance with this aspect of the present invention, using the diorganomonothiophosphinate collectors, bulk sulfide flotation is obtained at a higher pH of 6.0 to 9.0, and the lime consumption needed in the second stage of flotation, i.e., the separation of value metal sulfides from iron sulfides, is reduced. Moreover, the diorganomonothiophosphinate collectors of this invention are much stronger collectors for copper, nickel, lead and zinc in the pH range of 9.0 to 11.0, such that the second stage flotation may be carried out at pH values just sufficient to depress the iron sulfides, in which case there is no need to raise the pH beyond 11.0, thereby providing further savings in lime consumption.

The new and improved diorganomonothiophosphinate collectors and processes of this invention incorporating same provide still another surprising and unexpected advantage over prior art collectors and methods because they permit easier and better secondary separation recoveries. Typically, in flotation processes, a combination of value sulfide minerals will be floated and collected to provide a complex mineral concentrate containing a variety of value sulfide minerals, for example a bulk concentrate of copper and molybdenum sulfides. A slurry of the bulk Cu-Mo concentrate is subjected to secondary recovery flotation processing, wherein a depressant selective for copper sulfide minerals and a collector selective for molybdenum sulfide minerals are added, respectively. Upon flotation, separation is achieved because molybdenum sulfide values report to the froth to form a Mo- rich concentrate and the depressed copper sulfide values remain in the tailings.

In these secondary recovery operations for Cu-Mo bulk concentrates, large dosages of copper depressants are used annually all over the world. Often the depressant cost is a major factor in the total reagent costs for a given plant operation. Typically, highly toxic reagents are used as the copper depresssants in the secondary recovery processes, such as sodium hydrosulfide (NaHS), sodium cyanide (NaCN) and Nokes Reagent, i.e., a mixture of phosphorus pentasulfide ($P_2S_5$) and sodium hydroxide (NaOH). These depressant reagents are relatively expensive and because of their toxicity require special handling in use and removal. It is therefore highly desirable to reduce the depressant dosage.

It is known that depressant dosages may be very high for certain minerals as compared with other minerals. More particularly, the copper mineral chalcocite ($Cu_2S$) requires a much larger depressant dosage than the related mineral chalcopyrite ($CuFeS_2$). Another factor relating to the depressant dosages required for secondary recovery is the collector used to float the bulk concentrate, because some collectors adhere to sulfide minerals more tenaciously than others. For example, dithiophosphinates are believed to adsorb rather strongly on the value sulfide minerals, and as a result, high depressant dosages are required to depress a value mineral that has been floated with a dithiophosphinate collector. It has unexpectedly been discovered that the use of the diorganomonothiophosphinate collectors of this invention provides additional benefits in that the depressant dosages which are needed in secondary recovery operations are surprisingly reduced, often as low as one tenth of the dosage required with prior art collectors even for concentrates containing chalcocite.

Other objects and advantages provided by the new and improved collectors and process of this invention will become apparent from the following working Examples, which are provided by way of further illustration only to enable those skilled in this art to better understand and practice the present invention.

In each of the following Examples, the following general preparation and testing procedures were used:

The sulfide ores were crushed to −10 mesh sizes. An amount of the crushed ores of between about 500 to 2,000 grams was wet ground in a steel ball mill with a steel ball charge of 5.3 to 10.7 kg and at 50 to 75% solids for about 6 to 14 minutes or until a pulp having the size distribution indicated was obtained, generally about 10–20% +65 mesh, 14–30% +100 mesh and 40–80% −200 mesh. Lime and sulfuric acid were used as the pH modifiers to adjust the pH as required. These modifiers were generally added to the grind. The frother used was added to the grind in some tests and added to the flotation cell in others. In certain tests, 50% the collector was added to the grind, otherwise, the collector was added to the first and second stages of conditioning in the flotation cell.

The size reduced pulp, with or without frother and collector additives, was transferred to a Denver D12 rectangular flotation cell. The volume of the pulp was adjusted to 1200–2650 ml by adding water to provide a pulp density of about 20–45% solids and a pulp level in the cell at about 2 cm below the lip.

Collector and/or frother were added to the pulp while agitating at about 1100–1400 rpm. The pulp was conditioned for a period of two minutes and pH and temperature measurements were taken at that time. At the end of the two minutes conditioning, air was fed at about 5–7 liters/minute from a compressed air cylinder. The froth flotation was continued for about 3 minutes during which a first stage concentrate was collected. Thereafter the air was turned off and more collector and frother were added and the pulp was conditioned for an additional two minutes. After the second two minute conditioning step the air was turned on and a second stage concentrate was collected. The flotation times were predetermined to give a barren froth upon completion of flotation.

The first and second stage concentrates and tailings were filtered, dried, sampled and assayed for copper, iron and sulfur. Tap water at the required temperature was used in all tests. The abbreviation t is used to indicate a standard ton, e.g., 2000 lbs. and T represents a metric ton, e.g., 1000 kg. or 2204 lbs. In each of the following Examples, the gangue iron minerals such as pyrite, pyrrhotite, etc., are for the sake of convenience, simply referred to as pyrite.

In the following Examples, several ore samples, referred to as Ores A–E, were subjected to the flotation methods described for each ore as follows:

ORE A

This Southwestern U.S. Cu-Mo ore contained 0.458% copper and 2.2% pyrite. The ore contained chalcopyrite, chalcocite and covellite as the major copper minerals.

About 1000 g. of the −10 mesh ore was wet ground for 8 min. in a steel ball mill with a steel ball charge of 10.7 kg and at 63% solids to yield a pulp with a size distribution of about 16.4% +65 mesh, 30% +100 mesh and 43.8% −200 mesh. Lime and sulfuric acid were added, as required, to adjust the pH. 14 g./T of frother (pine oil/MIBC 50:50) were added also to grind. 50% of the total collector was added to grind in certain tests; otherwise, collector was added to 1st and 2nd stages of conditioning in the flotation cell.

The ground pulp was transferred to a Denver D12 rectangular flotation cell, the volume of pulp was adjusted to 2650 ml by adding water to give a pulp density or approx. 32% solids and the pulp level at 2 cm from lip. Collector and frother were added to the pulp while agitating at 1400 rpm. The pulp was conditioned for 2 min. pH and temperature measurements were made during conditioning. At the end of the 2 min. conditioning, air was fed at 7 l/min. from a compressed air cylinder and a 1st stage concentrate was collected for 3 min. Air was turned off and more collector and frother were added and the pulp was conditioned for an additional 2 min. at the end of which air was turned on and a second stage concentrate was collected. The flotation time was predetermined to give a barren froth (completion of flotation).

ORE B

This South American Cu-Mo ore contained 1.65% Cu (as chalcocite, chalcopyrite, covellite, bornite and some oxide copper minerals such as malachite and cuprite), 2.5% pyrite and 0.025% Mo. Although the ore contained a large amount of chalcopyrite, an appreciable amount of it was rimmed with chalcocite and covellite.

About 500 g. of the −10 mesh Cu-Mo ore were wet ground for 13 min. in a steel ball mill for 13 min. with a steel ball charge of 5.3 kg and at 63% solids to yield a pulp with a size distribution of 14% +100 mesh and 62% −200 mesh. Lime or sulfuric acid were added, as required, to adjust the pH. 10.5 g/T of diesel oil were also added in all tests. Collector was added to the flotation cell in the 1st and 2nd stages of conditioning. The procedure for flotation was identical to that described for Ore A.

ORE C

This South American Cu-Mo ore contained 1.844% Cu and 4.2% pyrite. The copper minerals were predominantly chalcocite, chalcopyrite, covellite and bornite.

510 g of the ore were wet ground for 7.5 min. at 68% solids to obtain a pulp with the size distribution of 24.7% +65M, 38.3% +100M and 44% −200M. 2.5 g/T of di-sec butyl dithiophosphate were added to the grind in all of the tests. Lime was also added to the grind to obtain the required pH in flotation. The pulp was transferred to the flotation cell and conditioned at 1100 rpm and 32% solids. The flotation procedure was the same as that described for Ore A.

ORE D

This ore was from a Southwestern U.S. mine. It contained 0.867% Cu and 7.0% pyrite. The principal copper mineral was chalcopyrite. It also contained some chalcocite, covellite and bornite.

The procedure for grinding and flotation was the same as that described for Ores A–C. 510 g of ore were ground for 8.5 min. at 65% solids to obtain a pulp with the size distribution of 5.8% +65M, 19% of 100M and 53.3% of −200M. The pulp was conditioned at 1300 rpm and 31.9% solids. The frother used was 70/30 mixture of polypropylene glycol/polypropylene glycol monomethyl ether.

ORE E

This Cu-Mo ore was from Southwestern U.S., and was one of the most complicated ores used in terms of complex mineralogy, low overall copper recovery, high lime consumption, frothing problems, etc. The ore contained predominantly chalcocite, and the pyrite in the ore was excessively rimmed and disseminated with chalcocite and covellite. Pyrite separation in the rougher flotation was, therefore, not possible and was not attempted also. The head assays for copper and pyrite are 0.778% and 5.7% respectively.

The procedure for grinding and flotation was the same as that described for Ores A–D. 880 g of the ore were conditioned with 500 g/T of ammonium sulfide and ground for 6 min. at 55.5% solids to obtain a pulp with the size distribution of 17.4% +65M, 33% +100M and 47.4% −200M. The pulp was conditioned at 1500 rpm and 20.4% solids.

EXAMPLES 1-6

Acid Circuit Flotation, pH 4.0

In the following tests, Ore B was used. The conventional collector used with this ore comprises a 60/30/10 blend of diethyl xanthogen formate/diesel fuel/methyl isobutylcarbinol (MIBC) added at a dosage of from about 30 to 40 g/T. The frother used was a poly alkylene glycol mono alkyl ether, such as polypropylene glycol monomethyl ether added at 60.1 g/T. The pH of the pulp slurry was adjusted to about 4.0 by addition of sulfuric acid. The pulp slurry was conditioned with the collector indicated and floated in accordance with the method given above for Ore B. The collectors employed and the results of the concentrate and tailings assays are set forth below. In addition, a selectivity/performance index was calculated for each of the collectors tested.

More particularly, the selectivity/performance index was defined and calculated in accordance with the equation:

$$I_{cu} = \frac{(100 - \%\ \text{Pyrite recovered})}{(100 - \%\ \text{Copper recovered})^2}$$

The selectivity index for copper is a convenient method for measuring not only the copper recovery of a collector but also its selectivity for rejecting pyrite. For example, with a particular ore, if a 90% recovery for copper and a 92% recovery of pyrite can be accepted as optimum, then the optimum selectivity index for copper would be $$I_{cu} = \frac{(100 - 92)}{(100 - 90)^2} = 0.08$$

The collectors tested and the results obtained are set forth in Table 1 as follows:

TABLE I

Ore B, Head Cu = 1.65%, $FeS_2$ = 2.5%
Frother, polypropylene glycol monomethyl ether, 60.1 g/T
pH 4.0, Sulfuric Acid 5.0 kg/T

| Example | Collector | g/T | % Cu Rec. | % Cu Grade | % $FeS_2$ Rec | $I_{Cu}$ |
|---|---|---|---|---|---|---|
| A | Standard blend | 5 | 33.4 | 3.4 | 15.8 | 0.019 |
| B | " | 10 | 46.7 | 4.5 | 21.1 | 0.028 |
| C | " | 20 | 80.4 | 6.7 | 79.4 | 0.054 |
| D | " | 30 | 89.6 | 7.2 | 91.5 | 0.078 |
| E | " | 40 | 90.1 | 7.2 | 92.2 | 0.080 |
| F | Pure Ethyl Xanthogen Ethyl Formate | 5 | 61.7 | 6.6 | 44.5 | 0.038 |
| G | Pure Ethyl Xanthogen Ethyl Formate | 15 | 88.5 | 8.8 | 88.2 | 0.090 |
| H | Pure Ethyl Xanthogen Ethyl Formate | 20 | 90.6 | 8.4 | 93.4 | 0.075 |
| I | Mixture of Diethyl mono and diethyl dithiophosphates | 5 | 50.5 | 5.3 | 22.4 | 0.032 |
| J | Mixture of Diethyl mono and diethyl dithiophosphates | 10 | 79.6 | 7.0 | 81.7 | 0.044 |
| K | Mixture of Diethyl mono and diethyl dithiophosphates | 20 | 89.7 | 8.2 | 90.5 | 0.090 |
| 1 | Diisobutyl Monothiophosphinate | 5 | 41.8 | 4.3 | 17.9 | 0.024 |
| 2 | Diisobutyl Monothiophosphinate | 10 | 72.3 | 7.1 | 70.2 | 0.039 |
| 3 | Diisobutyl Monothiophosphinate | 20 | 93.2 | 7.2 | 88.4 | 0.254 |
| 4 | 1,3,5-Triisopropyl-4,6-Dioxa-2-Phospha-Cyclohexand, monothiophosphinic acid, sodium salt | 5 | 63.1 | 6.5 | 34.7 | 0.048 |
| 5 | 1,3,5-Triisopropyl-4,6-Dioxa-2-Phospha-Cyclohexand, monothiophosphinic acid, sodium salt | 10 | 86.9 | 8.0 | 86.7 | 0.078 |
| 6 | 1,3,5-Triisopropyl-4,6-Dioxa-2-Phospha-Cyclohexand, monothiophosphinic acid, sodium salt | 20 | 92.4 | 8.2 | 89.4 | 0.184 |

As shown by the data in Table 1, it is clear that the novel collectors of this invention, Examples 1-6, exhibited superior collector performance over both the conventional blended collector of Examples A-E and the pure conventional diethyl xanthogen formate collector of Examples F-H. The novel collectors outperformed the standard collector at all dosages and even the pure diethyl xanthogen formate of Examples F-H. The grades and pyrite recoveries obtained with the novel collectors of Examples 1-6 were comparable to those obtained with the conventional collectors. The excellent performance of the new and improved collectors of the present invention at a dosage level of 20 g/T, shown in Examples 3 and 6, is indicated by the very high $I_{cu}$ values obtained, e.g. 0.254 and 0.184, respectively, as compared with those obtained using conventional collectors, e.g. as shown in Example E wherein at a dosage level of 40 g/T an $I_{cu}$ value of only 0.08 was obtained and in Example H at a dosage of 20 g/T, the $I_{cu}$ was only 0.075. It should also be noted that the collector mixture of diethylmonothiophosphate/diethyl dithiophosphate shown in Example I-K gave poor performance compared with the collectors of the present invention Examples 1-6.

EXAMPLES 7-8

Acid Circuit Flotation, pH 5.0

In the following Examples, Ore A was used. The natural pH of Ore A without any addition of lime or sulfuric acid was found to be 5.0. The frother employed was a 1:1 blend of MIBC:Pine Oil added at 50 g/T. To make the comparison of collector performance for the various collectors tested more meaningful, the collectors were added on an equimolar basis. The dosages in these examples are, therefore, expressed as moles/metric ton of ore (M/T or mole/T), instead of lbs./t or g/T (0.03 M/T is about 0.01 lbs./t). The collectors were tested in accordance with the flotation procedure for Ore A detailed above, and the results obtained are set forth in Table 2 as follows:

TABLE 2

| Example | Collector | % Cu Rec. | % Cu Grade |
|---|---|---|---|
| Ore A, Natural pH 5.0 (no lime or $H_2SO_4$); Frother - 1:1 MIBC/Pine Oil at 50 g/T; Collectors at 0.03 Mole/Ton (approx. 0.01 lb./T) | | | |
| L | Sodium isobutyl xanthate | 33.2 | 4.3 |
| M | O—isobutyl N—ethyl thionocarbamate | 76.8 | 8.2 |
| N | O—isopropyl N—methyl thionocarbamate | 67.7 | 5.8 |
| O | Ethyl xanthogen ethyl formate, Batch 1 | 84.6 | 9.2 |
| P | Ethyl xanthogen ethyl formate, Batch 1 | 88.2 | 7.1 |
| Q | Ethyl xanthogen ethyl formate, Batch 2 | 86.2 | 6.3 |
| R | Ethyl xanthogen ethyl formate, Batch 3, Pure | 85.7 | 6.4 |
| S | Sodium n-butyl trithiocarbonate | 58.8 | 6.4 |
| T | Isobutyl xanthogen ethyl formate | 85.6 | 7.7 |
| U | Isopropyl xanthogen ethyl formate | 86.2 | 6.5 |
| V | Isopropyl xanthogen butyl formate | 88.7 | 6.1 |
| W | Diethyl monothiophosphate (pure) | 83.1 | 5.4 |
| X | Mixture of diethyl mono and diethyl dithiophosphate | 82.0 | 6.5 |
| Y | Ammonium diisobutyl dithiophosphinate 0.12 M/T* | 69.3 | 2.3 |
| Z | Sodium ethyl xanthate 0.19 M/T* | 18.6 | 0.7 |
| 7 | Ammonium diisobutyl monothiophosphinate | 92.2 | 8.2 |
| 8 | 1,3,5-Triisopropyl-4,6-Dioxa-2-phospha-cyclohexane, monothiophosphinic acid, sodium salt | 89.7 | 6.6 |

*Flotation recovery was extremely low at 0.03 M/T for these collectors.

As shown by the data of Table 2, the collectors of this invention shown in Examples 7 and 8 gave the best performance at a pH of 5.0 as compared with the conventional collectors of Examples L–Z. The grade of the copper concentrate for Examples 7–8 was also excellent. These results clearly demonstrate the superiority of the diorganomonothiophosphinate collectors of this invention.

EXAMPLES 9–13

Flotation in Slightly Acid, Neutral and Slightly Alkaline Circuits

In the following Examples, Ore B was used. The conventional collector for this ore is the same standard blend given in Examples 1–6. The frother was again polypropylene glycol monomethyl ether added at 60.1 g/T. The natural pH of Ore B was found to be 5.5. Lime was added as the modifier, to adjust the pH to the higher values shown in some tests.

The collectors of this invention were tested and compared to several conventional collectors at various pH values and at several dosages of collector. The collectors tested and the results obtained are set forth in Table 3, as follows:

TABLE 3

| Example | Collector | g/T | pH | % Cu Rec. | % Cu Grade | % $FeS_2$ Rec. | $I_{cu}$ |
|---|---|---|---|---|---|---|---|
| Ore B, Head CU = 1.65%, $FeS_2$ = 2.5%, Frother 60.1 g/T | | | | | | | |
| AA | Standard blend | 20 | 5.5 | 66.1 | 6.7 | 69.5 | 0.026 |
| BB | Standard blend | 20 | 7.5 | 75.5 | 7.2 | 49.0 | 0.085 |
| CC | Standard blend | 20 | 8.5 | 78.5 | 8.7 | 43.0 | 0.123 |
| DD | Ethyl Xanthogen Ethyl Formate (Pure) | 5 | 5.5 | 47.9 | 5.0 | 49.1 | 0.019 |
| EE | Ethyl Xanthogen Ethyl Formate (Pure) | 15 | 5.5 | 69.6 | 8.1 | 72.5 | 0.030 |
| FF | Ethyl Xanthogen Ethyl Formate (Pure) | 5 | 7.5 | 76.1 | 13.8 | 30.8 | 0.121 |
| GG | Ethyl Xanthogen Ethyl Formate (Pure) | 5 | 8.5 | 72.1 | 13.9 | 28.4 | 0.092 |
| HH | Ethyl Xanthogen Ethyl Formate (Pure) | 15 | 8.5 | 80.5 | 10.8 | 49.6 | 0.133 |
| II | Mixture of diethyl mono- and diethyl dithiophosphate | 20 | 5.5 | 62.6 | 7.8 | 75.7 | 0.017 |
| JJ | Mixture of diethyl mono- and diethyl dithiophosphate | 40 | 5.5 | 61.6 | 6.7 | 75.1 | 0.017 |
| KK | Mixture of diethyl mono- and diethyl dithiophosphate | 20 | 8.5 | 79.9 | 10.7 | 64.9 | 0.084 |
| LL | Diethyl monothiophosphate | 20 | 5.5 | 64.8 | 8.2 | 76.0 | 0.019 |
| MM | Diethyl monothiophosphate | 40 | 5.5 | 71.2 | 7.4 | 83.0 | 0.021 |
| NN | Diethyl monothiophosphate | 20 | 8.5 | 31.2 | 6.3 | 16.4 | 0.018 |
| 9 | Diisobutyl monothiophosphinate | 5 | 5.5 | 66.8 | 9.1 | 68.1 | 0.029 |
| 10 | Diisobutyl monothiophosphinate | 20 | 5.5 | 76.6 | 7.4 | 78.7 | 0.039 |
| 11 | Diisobutyl monothiophosphinate | 5 | 7.5 | 80.5 | 13.2 | 56.5 | 0.114 |
| 12 | Diisobutyl monothiophosphinate | 5 | 8.5 | 77.8 | 13.7 | 41.5 | 0.119 |
| 13 | Diisobutyl monothiophosphinate | 20 | 8.5 | 83.4 | 7.2 | 84.5 | 0.056 |

The results shown in Table 3 demonstrate the superiority of the collectors of this invention over the conventional collectors employed in the prior art.

More particularly, at the natural pH of 5.5 with no pH modifier added, the collectors of this invention shown in Examples 9 and 10, exhibited better copper recovery and grade with better selectivity against pyrite, even at dosages of ¼ those used with the conventional collectors shown in Examples AA, DD, EE, II, JJ, LL and MM.

Moreover, the superior performance of the collector within the scope of this invention shown in Examples 11–13 is evident from the results obtained at a pH of 7.5 and 8.5 and at only ¼ of the standard collector dosage. Not only higher copper recoveries, but also better grades and selectivity over pyrite were obtained with the collector of Examples 11–13, which is reflected in the higher $I_{cu}$ values. At pH 8.5, the performance of the collector of Examples 12–13 was equal to or better than the standard blend conventional collector of Example CC, but at ¼ the dosage used for the conventional collector. At a dosage of 5 g/T, the collector of Example 12 outperformed even the pure ethyl xanthogen ethyl formate of Examples GG and HH. The results set forth in Table 3 also show that the collectors of this invention are far superior to the pure diethyl monothiophosphate of Examples LL–NN, as well as, the conventional mixture of diethyl mono- and diethyl dithiophosphate of Examples II–KK.

EXAMPLES 14–17

Alkaline Circuit Flotation, pH 8.0–10.5

In the following Examples, Ore C was used. The conventional collector for this ore is sodium isopropyl xanthate. The frother used was a 1:1:1 mixture of polypropylene glycol/MIBC/Pine oil added at 25.5 g/T. Lime was used at the dosages indicated to adjust the pH to the alkaline values shown. The collectors tested and the results obtained are set forth in Table 4, as follows:

TABLE 4

Ore C, Head Cu = 1.85%, $FeS_2$ = 4.2%, Frother - 1:1:1 polypropylene glycol/MIBC/Pine Oil 25.5 g/T, Collector Dosage and pH - see below

| Example | Collector | M/T | Lime kg/T | pH | % Cu Rec. | % Cu Grade | % $FeS_2$ Rec. | $I_{cu}$ |
|---|---|---|---|---|---|---|---|---|
| OO | Sodium isopropyl xanthate | 0.0625 | 0.29 | 9.3 | 71.8 | 13.5 | 65.5 | 0.043 |
| PP | Sodium isopropyl xanthate | 0.0625 | 0.55 | 10.2 | 80.8 | 12.9 | 83.6 | 0.045 |
| QQ | Sodium isopropyl xanthate | 0.0625 | 0.59 | 10.5 | 81.9 | 13.9 | 81.9 | 0.055 |
| RR | Sodium isopropyl xanthate | 0.1250 | 0.53 | 10.5 | 84.4 | 11.8 | 86.2 | 0.057 |
| SS | Sodium isopropyl xanthate | 0.1900 | 0 | 7.0 | 18.6 | 8.0 | 8.7 | 0.014 |
| TT | Sodium isopropyl xanthate | 0.1900 | 0.11 | 8.0 | 60.0 | 16.0 | 62.0 | 0.023 |
| UU | Sodium isopropyl xanthate | 0.1900 | 0.29 | 9.0 | 79.3 | 16.0 | 83.1 | 0.040 |
| VV | Sodium isopropyl xanthate | 0.1900 | 0.53 | 10.5 | 85.5 | 15.6 | 88.1 | 0.057 |
| WW | Sodium isopropyl xanthate | 0.2500 | 0.53 | 10.5 | 84.0 | 15.0 | 87.6 | 0.048 |
| XX | Sodium isopropyl xanthate | 0.3150 | 0.53 | 10.5 | 84.0 | 13.9 | 87.7 | 0.048 |
| YY | Allyl amyl xanthate ester | 0.1250 | 0.11 | 8.0 | 55.0 | 13.6 | 24.9 | 0.037 |
| ZZ | Allyl amyl xanthate ester | 0.1250 | 0.29 | 9.0 | 49.0 | 12.2 | 20.3 | 0.031 |
| AAA | Ammonium diisobutyl dithiophosphinate | 0.1250 | 0.29 | 9.0 | 62.6 | 13.9 | 46.3 | 0.038 |
| 14 | Ammonium diisobutyl monothiophosphinate | 0.0625 | 0.11 | 8.0 | 87.1 | 15.8 | 79.5 | 0.124 |
| 15 | Ammonium diisobutyl monothiophosphinate | 0.1250 | 0 | 7.0 | 86.0 | 13.7 | 86.3 | 0.070 |
| 16 | Ammonium diisobutyl monothiophosphinate | 0.1250 | 0.11 | 8.0 | 86.9 | 14.8 | 83.0 | 0.099 |
| 17 | Ammonium diisobutyl monothiophosphinate | 0.1250 | 0.29 | 9.0 | 89.6 | 11.5 | 84.6 | 0.130 |

The data of Table 4 demonstrate that the novel collectors of this invention shown in Examples 14–17 give excellent collector performance in terms of improved copper recovery/grade and pyrite rejection at reduced lime consumption and reduced collector dosage in alkaline flotation environments.

The results demonstrate that the conventional xanthate collector provides unacceptably low copper recovery in the pH range from 7 to 10.2, see Examples OO, PP and SS-UU. The maximum copper recovery with the standard collector was 85.5% at a pH of 10.5 and a dosage of 0.19 M/T (Example VV). The collector of this invention provided a maximum recovery of 89.6% at a dosage of only 0.125 M/T at a pH of 9.0. At pH 9.0 the lime consumption was only 0.29 kg/T which was about 55% of the lime consumption for the standard collector, i.e. 0.53 kg/T to give pH 10.5. Even at a dosage of only 0.0625 M/T, and at a pH of 8.0, the collector of this invention shown in Example 14 provided a copper recovery of 87.1% which was still 1.5 percentage points higher than the best performance of the conventional collector. Moreover, the results of Example L were obtained at a pH of 8.0 and a lime consumption of 0.11 kg/T, which was only 20% of the lime required to provide inferior results with the conventional collector at pH 10.5 The $I_{cu}$ values shown in Table 4 also reflect the superiority of the collectors of this invention. The maximum $I_{cu}$ obtained with the conventional collector was 0.057 at a pH of 10.5, whereas the maximum $I_{cu}$ for the collector of this invention was 0.130 at a pH of 9.0. The inferiority of some other conventional collectors is quite evident from the data of Table 4 as shown by Examples YY, ZZ and AAA.

EXAMPLES 18–21

In the following Examples, Ore E was used. The frother employed was cresylic acid added at 150 g/T. The conventional collector for this ore is N-ethyl-O-isopropyl thionocarbamate at a dosage of 31 g/T (0.21 M/T) and at an operating pH of 11.5. At this operating pH, lime consumption conventionally is 3.07 kg/T. The collectors tested and the results obtained are set forth in Table 5 as follows:

TABLE 5

Ore E, Head Cu = 0.78%, $FeS_2$ = 5.7%, Frother - Cresylic Acid - 150 g/T

| Example | Collector | Dosage M/T | pH | Lime kg/T | % Cu Rec. | % Cu Grade | % $FeS_2$ Rec. | $I_{cu}$ |
|---|---|---|---|---|---|---|---|---|
| BBB | N—ethyl O—isopropyl thionocarbamate | 0.105 | 8.0 | 0.23 | 74.3 | 10.3 | 62.2 | 0.057 |
| CCC | N—ethyl O—isopropyl thionocarbamate | 0.210 | 8.0 | 0.23 | 68.6 | 8.3 | 73.5 | 0.027 |
| DDD | N—ethyl O—isopropyl thionocarbamate | 0.210 | 9.0 | 0.85 | 79.1 | 8.9 | 71.5 | 0.065 |
| EEE | N—ethyl O—isopropyl thionocarbamate | 0.210 | 10.3 | 1.59 | 81.6 | 10.1 | 64.4 | 0.105 |

TABLE 5-continued

| Ore E, Head Cu = 0.78%, $FeS_2$ = 5.7%, Frother - Cresylic Acid - 150 g/T | | | | | | | | |
|---|---|---|---|---|---|---|---|---|
| Example | Collector | Dosage M/T | pH | Lime kg/T | % Cu Rec. | % Cu Grade | % $FeS_2$ Rec. | $I_{cu}$ |
| FFF | N—ethyl O—isopropyl thionocarbamate | 0.105 | 11.5 | 3.07 | 57.8 | 15.4 | 24.4 | 0.042 |
| GGG | N—ethyl O—isopropyl thionocarbamate | 0.210 | 11.5 | 3.07 | 81.0 | 11.6 | 54.8 | 0.126 |
| HHH | N—methyl O—isopropyl thionocarbamate | 0.150 | 11.5 | 3.07 | 57.0 | 17.0 | 22.5 | 0.042 |
| III | Allyl amyl xanthate ester | 0.105 | 8.0 | 0.23 | 28.8 | 8.3 | 31.5 | 0.014 |
| JJJ | Allyl amyl xanthate ester | 0.105 | 9.0 | 0.74 | 46.7 | 12.0 | 30.6 | 0.024 |
| KKK | Allyl amyl xanthate ester | 0.210 | 8.0 | 0.23 | 35.8 | 10.0 | 33.2 | 0.016 |
| LLL | Sodium diisobutyl dithiophosphate | 0.210 | 8.0 | 0.23 | 60.1 | 9.8 | 51.5 | 0.030 |
| MMM | Ammonium diisobutyl dithiophosphinate | 0.105 | 9.0 | 0.74 | 57.6 | 11.3 | 33.9 | 0.037 |
| NNN | Sodium butyl trithiocarbonate | 0.105 | 8.0 | 0.23 | 26.3 | 7.6 | 24.1 | 0.014 |
| OOO | Sodium butyl trithiocarbonate | 0.210 | 8.0 | 0.74 | 47.2 | 8.7 | 47.4 | 0.019 |
| 18 | Ammonium diisobutylmonophosphinate | 0.105 | 8.0 | 0.23 | 79.1 | 8.2 | 84.6 | 0.035 |
| 19 | Ammonium diisobutylmonophosphinate | 0.105 | 9.0 | 0.74 | 81.1 | 10.3 | 64.6 | 0.099 |
| 20 | Ammonium diisobutylmonophosphinate | 0.105 | 10.0 | 1.36 | 75.9 | 13.1 | 45.5 | 0.093 |
| 21 | Ammonium diisobutylmonophosphinate | 0.210 | 8.0 | 0.23 | 82.7 | 7.7 | 93.4 | 0.022 |

As demonstrated by the data of Table 5, the new and improved collector within the scope of the present invention shown in Examples 18–21, provided copper recoveries essentially equivalent or superior to those obtained with the conventional collectors shown in Examples EEE–GGG at pH of 10.3 and 11.5, respectively. The most important result was that the use of the collector of this invention provided good flotation results at a lime consumption reduced by more than 50% to 70% of the levels required in using the conventional collector. More particularly, for the collector of this invention shown in Example 21, the lime consumption at a pH of 8.0 and at a dosage of 0.21 M/T was only about 8% of the lime consumption required (3.07 kg/T) for the conventional collector at pH 11.5. At a pH of 9.0, the collector of Example 19 exhibited good selectivity against pyrite and good grade, using only 24% of the lime consumption needed for the conventional collector of Example FFF, and Example FFF was clearly inferior in terms of copper recovery, grade, pyrite rejection and $I_{cu}$ value under conventional conditions for that collector. At pH 9.0, copper recovery and pyrite rejection for Example 19 were better than that exhibited by Example DDD At two times the dosage, even with this difficult to separate ore, wherein higher pyrite recoveries were inevitable. The other conventional collectors shown in Examples HHH–OOO gave poor copper recoveries and poor metallurgy, as did the conventional collector of Examples BBB–DDD at pH of 8.0 and 9.0.

EXAMPLES 22–23

In the following Examples, Ore D was used. The conventional collector for this ore is sodium amyl xanthate employed at pH 11.5, lime consumption 3.92 g/T. The frother used was a 70/30 mixture of polypropylene glycol/polypropylene glycol monomethyl ether, added at 91 g/T. The collectors tested and the results obtained are set forth in Table 6 as follows:

TABLE 6

| Ore D, Head CU = 0.867%, $FeS_2$ = 7.0%, Frother 91 g/T, | | | | | | |
|---|---|---|---|---|---|---|
| Example | Collector | Dosage Mole/T | pH | Lime kg/T | % Cu Rec. | % Cu Grade |
| PPP | Sodium amyl xanthate | 0.124 | 8.0 | 0 | 68.1 | 8.8 |
| QQQ | Sodium amyl xanthate | 0.124 | 9.0 | 0.39 | 78.9 | 6.5 |
| RRR | Sodium amyl xanthate | 0.124 | 9.7 | 1.0 | 82.7 | 8.7 |
| SSS | Sodium amyl xanthate | 0.124 | 10.7 | 2.0 | 84.0 | 7.0 |
| TTT | Sodium amyl xanthate | 0.124 | 11.5 | 3.92 | 88.6 | 8.5 |
| UUU | Sodium n-butyl trithiocarbonate | 0.062 | 8.0 | 0 | 51.7 | 5.6 |
| VVV | Sodium n-butyl trithiocarbonate | 0.124 | 8.0 | 0 | 68.5 | 6.8 |
| WWW | Allyl amyl xanthate ester | 0.062 | 8.0 | 0 | 31.8 | 7.1 |
| XXX | Allyl amyl xanthate ester | 0.062 | 9.0 | 0.39 | 31.0 | 6.1 |
| YYY | Allyl amyl xanthate ester | 0.124 | 8.0 | 0 | 41.0 | 8.1 |
| ZZZ | Diisobutyl dithio phosphate | 0.062 | 8.0 | 0 | 67.6 | 7.8 |
| AAAA | Diisobutyl dithio phosphate | 0.062 | 9.0 | 0.39 | 21.7 | 3.7 |
| BBBB | Diisobutyl dithio phosphinate | 0.062 | 9.0 | 0.39 | 76.3 | 6.6 |
| 22 | Ammonium diisobutyl monothiophosphinate | 0.124 | 8.0 | 0 | 89.5 | 5.8 |
| 23 | Ammonium diisobutyl monothiophosphinate | 0.124 | 9.0 | 0.39 | 87.7 | 8.6 |

The data of Table 6 again demonstrate the superiority in collector activity for the collectors of the present invention over the conventional collectors employed in the prior art. As shown by Example 22, at a dosage of 0.124 M/T, the collector of this invention provided a copper recovery of 89.5% at pH 8.0 with no lime consumption, whereas the conventional collector of Examples PPP and TTT provided copper recoveries of only 68.9 and 88.6 at pH 8.0 and 11.5, respectively, at a lime consumption of 0 kg/T and 3.95 kg/T, respectively. Example 23 shows that at pH 9.0 the collector of this invention provided a copper recovery of 87.7% as compared with 78.9% obtained with Example QQQ at the same lime dosage.

It is also quite evident from the data of Table 6, that all of the other conventional collectors shown in Examples UUU-BBBB showed inferior metallurgy, as compared with Examples 22-23.

EXAMPLE 24

In the earlier examples, it has been demonstrated that the new and improved diorgano monothiophosphinate collectors of the present invention exhibit superior performance at reduced or no lime consumption and at reduced dosages of collector as compared with a large number of conventional collectors on a variety of ores in the rougher or first stage flotation. In actual practice, the rougher concentrate is cleaned in one or more stages to obtain a high grade copper minerals or copper-molybdenum minerals concentrate for further treatment for metal production.

The following examples illustrate the use of the new and improved diorgano monothiophosphinate collectors in cleaner flotation systems to provide higher copper grade concentrates for use in smelters or the like.

In the following examples, the Ore C was used. The first stage or rougher flotation was performed in accordance with the methods described above for this ore. The concentrate was filtered and dried and then reground at a pulp density of approximately 40% solids. The pH of the regrind was adjusted with lime and more collector and frother were added as needed. The reground pulp was conditioned and refloated as before with the rougher concentrate to provide cleaner concentrate and cleaner tails. The cleaner tails were scavenged at gradually higher pH values, with or without further addition of collector and frother, and finally scavenged at a pH of greater than 11.0 with additional collector to float any remaining copper minerals, and each stage product was separately analyzed.

The following Table 7 shows the results obtained by subjecting the ore to a rougher stage flotation and a second stage or cleaner flotation, using a standard sodium isopropyl xanthate collector at pH 11.0 for comparison. Additional collector was added in Example 24, in the stage 2 cleaner flotation, because it appeared that the amount added in the rougher flotation was not enough to carry over into the cleaner flotation. The standard collector carried over and was present in sufficient quantities in the second stage flotation, so that no additional collector was added in the second stage control. The frother used was a 1:1:1 blend of polyethylene glycol/MIBC/Pine Oil added at the dosage indicated.

The results obtained are set forth in Table 7 as follows:

TABLE 7

Ore C, Head Cu = 1.85%, $FeS_2$ = 4.2%,
Frother - 1:1:1 polyethylene glycol/MIBC/Pine Oil

| EXAMPLE FLOTATION STAGES | CCCC Standard Collector | 24 Ammonium Diisobutyl Monothio-phosphinate |
|---|---|---|
| Rougher | | |
| Collector Dosage, g/T | 30 | 12 |
| pH | 10.5 | 8.5 |
| Lime, kg/T | 0.608 | 0.108 |
| Recovery, | | |
| % Cu | 86.9 | 88.7 |
| % $FeS_2$ | 90.9 | 87.7 |
| % Mo | 64.0 | 66.8 |
| Grade of Rougher Conc. | | |
| % Cu | 18.30 | 16.75 |
| % Fe | 20.70 | 17.90 |
| Cleaners | | |
| Collector Dosage, g/T | — | 1.25 |
| pH | 11-11.6 | 8-10 |
| Lime, kg/T | 0.343 | 0.108 |
| Grade of Cleaner Conc. | | |
| % Cu | 39.4 | 41.4 |
| % Fe | 22.2 | 20.4 |
| % Mo | 0.56 | 0.62 |
| Total Collector Dosage, g/T | 30.0 | 13.3 |
| Lime Dosage, kg/T | 0.951 | 0.216 |
| Frother Dosage, g/T | 38.0 | 24.5 |

The results in Table 7 clearly demonstrate the excellent performance of the novel collector of Example 25, in both rougher and cleaner flotation compared with the standard collector. The following are especially noteworthy:

(a) The total collector dosage was only 13.3 g/T for the novel collector compared with the 30 g/T for the standard collector. This represents a savings in collector cost of about 56%.

(b) The total lime consumption in the case of the novel collector was 0.216 kg/T compared with 0.951 kg/T for the standard collector. This represents a savings in the lime cost of about 78%.

(c) The novel collector, indeed, appears to have some frothing properties of its own. There was a reduction in frother requirement of about 40%, with indications of larger reduction.

(d) The grade of the copper cleaner concentrate was 2 percentage points higher with the novel collector compared with the standard collector (41.4% vs. 39.4). This is a definite advantage also.

(e) The cleaner copper concentrate also had almost 2 percentage points lower iron in the case of novel collector compared with the standard collector (20.4% vs. 22.2%) thereby indicating acceptable selectivity against pyrite.

(f) The grade of Mo in the final concentrate was also higher in the case of the novel collector (0.62 vs. 0.56 for standard).

The foregoing results represent significant improvements achieved by using the novel collector over the conventional collector.

EXAMPLE 25

Cu-Mo Separation

A further requirement that the novel collector has to satisfy is the feasibility of Cu-Mo separation of the cleaner copper concentrate. It is necessary to demonstrate that the novel collector can be either desorbed or destroyed from the copper minerals using the conventional copper depressants since if this is not possible, the usefulness of the novel collector for low-lime flotation of copper would be severely limited.

Tests were carried out using Ore C. The procedure for this is essentially the same as that for cleaner flotation discussed in the previous section. The final cleaner concentrate obtained in the cleaner flotation is transferred to a small flotation cell, conditioned with additional frother and fuel oil (to enhance Mo flotation). Next the concentrate is conditioned with sodium hydrosulfide which is the standard copper depressant used for Ore C in the plant. $E_h$ and pH were constantly measured and controlled.

The detailed metallurgical results are given in Table 8 as follows:

TABLE 8

| EXAMPLE Collector Used | DDDD Standard Collector | 25 Ammonium Diisobutyl Monothiophosphinate |
|---|---|---|
| Rougher | | |
| Collector Dosage, g/T | 30 | 24.0 (note: a dosage of only 12 g/T is adequate, see Table 7) |
| pH | 10.5 | 8.8 |
| Recovery, | | |
| % Cu | 87.4 | 89.6 |
| % $FeS_2$ | 90.4 | 89.0 |
| % Mo | 51.8 | 54.0 |
| Cleaner | | |
| pH | 11.03 | 9.22 |
| Collector, g/T | 0 | 0 |
| Recovery, | | |
| % Cu | 97.3 | 96.2 |
| % Mo | 76.5 | 79.0 |
| Grade, | | |
| % Cu | 37.5 | 35.0 |
| % Mo | 0.59 | 0.59 |
| Cu—Mo Separation | | |
| pH | 11.33 | 10.45 (Higher because of NaHS) |
| Lime | 0 | 0 |
| Recovery, % Cu | 5.4 | 8.5 |
| NaHS, kg/T | 23-49 | 7.3 |
| Grade Conc. % Mo (after excessive addition of NaHS) | 0.72 | 2.11 |

It is quite evident that Cu depression occurs readily in the novel collector system.

The most important feature to note from these results is that the NaHS dosage required for substantial depression of copper is only 7.3 kg/T (in spite of overdosing) in the case of the novel collector compared with 23-49 kg/T required for the standard collector. This represents a savings of 70-85% in terms of the depressant cost when the novel collector is used, in addition to the large savings in the collector and lime costs.

It is thus seen that in the novel collector system, not only cleaner flotation and Cu-Mo separation are feasible, but also large savings can result when the novel collector is used instead of the conventional collector.

The foregoing Examples demonstrate the significant improvements and advantages achieved with the new and improved diorganomonothiophosphinate collectors of this invention over a number of conventional collectors known to those skilled in this art.

Although the present invention has been described with reference to certain preferred embodiments, modifications or changes may be made therein by those skilled in this art. For example, instead of the alkali metal and ammonium salts of diisobutylmonothiophosphinic acid and 1,3,5-triisopropyl-4,6-dioxa-2-phospha-cyclohexane monothiophosphinic acid, other diorganomonothiophosphinate compounds within the formula may be used, such as diisopropylmonothiophosphinates, bis(3,5-diethylcyclohexyl)monothiophosphinates, m-xylyl-isobutylmonothiophosphinates and 1,3,5-triisobutyl-4,6-dioxa-2-phospha-cyclohexane monothiophosphinates, to name but a few. Moreover, as has been mentioned above, the process may be practiced using as the collector component mixtures of two or more of the diorganomonothiophosphinates, as well as, mixtures of at least one diorgano monothiophosphinate collector in combination with another known collector which may be selected from, for example (a) xanthates or xanthate esters, e.g.

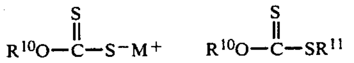

respectively;

(b) dithiophosphates

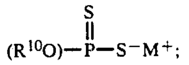

(c) thionocarbamates, e.g.

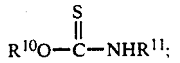

(d) dithiophosphinates, e.g.

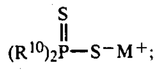

(e) dithiocarbamates, e.g.

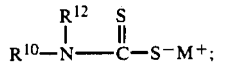

(f) trithiocarbonates and derivatives thereof,

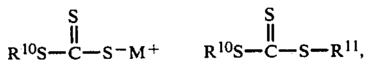

respectively; and (g) mercaptans, e.g., $R^{13}SH$;

wherein in each of (a)-(e) above $R^{10}$ is $C_1$-$C_6$ alkyl and $R^{11}$ is $C_1$-$C_6$ alkyl, aryl or benzyl, and $R^{12}$ is hydroxy or $R^{10}$ and in (g) $R^{13}$ is $C_1$-$C_{12}$ alkyl.

In place of copper mineral values, the process of the present invention may be used to beneficiate other sulfide mineral and metal values from sulfide ores, including, for example, nickel, cobalt, molybdenum, zinc, lead and iron. All such obvious modifications or changes may be made herein by those skilled in this art, without departing from the scope and spirit of the present invention as defined by the appended claims.

What is claimed is:

1. A collector composition for beneficiating base metal sulfide minerals from ores with selective rejection of gangue sulfide minerals, said collector composition comprising: a compound of the formula:

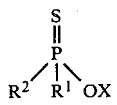

wherein $R^1$ and $R^2$ are each isobutyl radicals; or wherein $R^1$ and $R^2$ together form a heterocyclic ring having the formula:

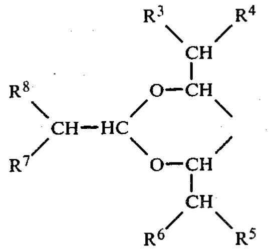

wherein $R^3$, $R^4$, $R^5$, $R^6$, $R^7$ and $R^8$ are each, independently, selected from hydrogen and $C_1$ to $C_{12}$ alkyl; and X is selected from hydrogen, alkali or alkaline earth metal and $NH_4$ groups.

2. A collector composition as defined in claim 1 wherein X is sodium.

3. A collector composition as defined in claim 1 wherein X is $NH_4$.

4. A collector composition as defined in claim 1, wherein in said heterocyclic ring, $R^3$, $R^4$, $R^5$, $R^6$, $R^7$ and $R^8$ are methyl and X is sodium.

5. A collector composition as defined in claim 1, wherein in said heterocyclic ring, $R^3$, $R^4$, $R^5$, $R^6$, $R^7$ and $R^8$ are methyl and X is $NH_4$.

* * * * *